Dec. 5, 1967          W. HUMPHREY          3,356,854
FOCUS INDICATING AND ADJUSTING DEVICE
Filed June 25, 1964          2 Sheets-Sheet 1
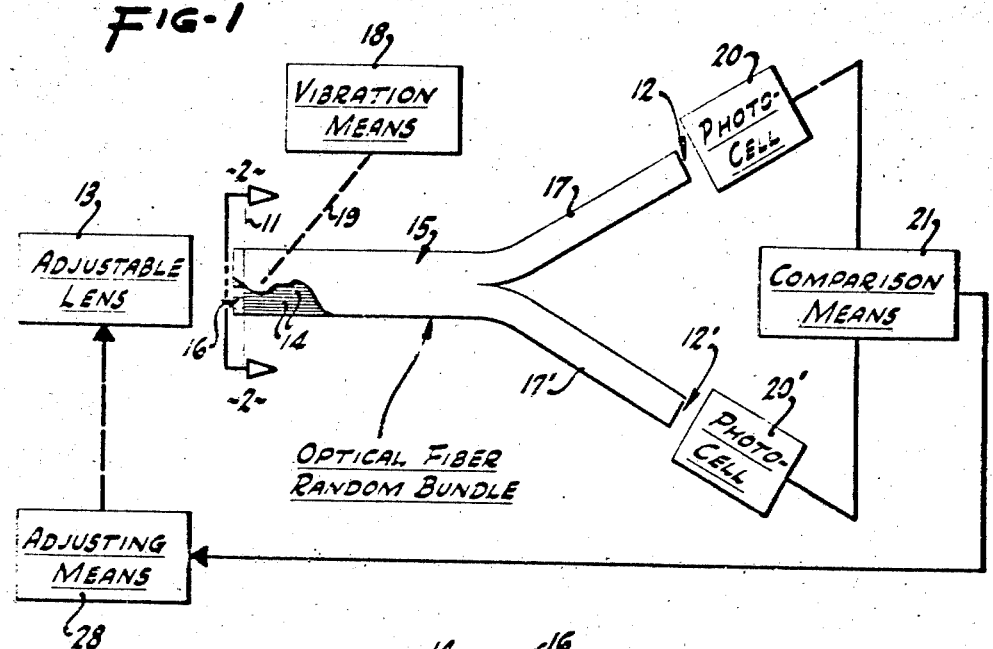
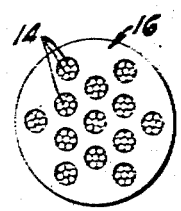
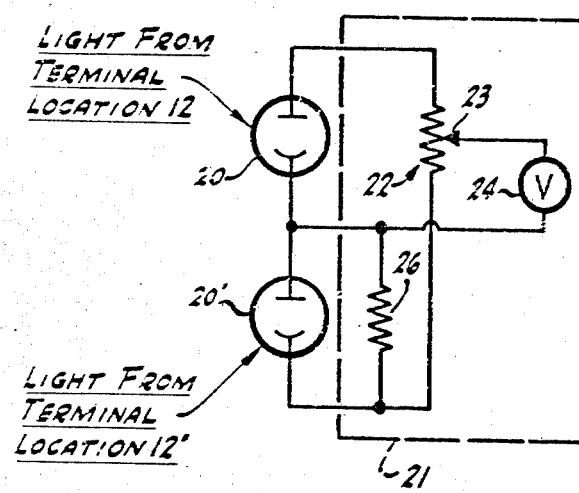
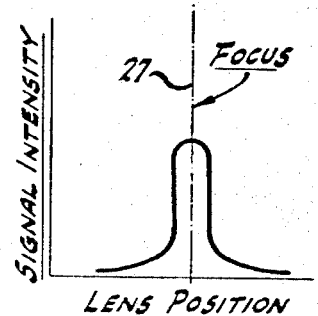
INVENTOR.
WILLIAM HUMPHREY
BY
Lippincott, Ralls & Henderson
ATTORNEYS

United States Patent Office

3,356,854
Patented Dec. 5, 1967

3,356,854
FOCUS INDICATING AND ADJUSTING DEVICE
William Humphrey, Berkeley, Calif., assignor, by mesne assignments, to Bell & Howell Company, Chicago, Ill., a corporation of Illinois
Filed June 25, 1964, Ser. No. 377,902
24 Claims. (Cl. 250—227)

ABSTRACT OF THE DISCLOSURE

A simple focus-indicating device incorporating a plurality of light paths extending from a desired focal plane in an optical device, such as a camera, to a conversion location whereat signals are produced indicating the intensity of transmitted light. A focused image has a larger variation between light and dark areas than a defocused image; this is employed herein to produce a variation in signal amplitude for different conditions of focus. The light paths may be divided into groups to thus derive more than one output signal that are compared to each other to produce a difference signal containing no background signals. The light paths may be moved as by oscillation to maximize signal output.

The invention is also adapted for automatic focus adjustment, as by means of a signal polarity determination and driving means, such as a servo, motor, for lens adjustment to optimum focus.

---

The present invention relates to devices for indicating when an optical image developed by a camera, range finder, or the like, is in best focus, or for automatically adjusting the focus in accordance with the focus indicating signal.

Devices are known which are capable of developing an observable signal, or the like, which is indicative of the best focus of an optical image. Such devices have been extensively employed with cameras, range finders, and other optical instruments, to indicate when the instrument is in focus, or in some instances, to automatically adjust the focus in accordance with the signal. However, previous devices of the foregoing type have usually been relatively complex and delicate, and in most instances, somewhat lacking in accuracy.

The present invention overcomes the foregoing difficulties and disadvantages by providing an extremely simple, yet accurate device, which may be of very rugged construction, for developing a signal which varies in accordance with the sharpness of focus of an optical image. The signal may thus be employed to indicate the best focus of the image. Alternatively, it may be utilized to control a servo drive mechanism, or equivalent means associated with an adjustable lens system producing the image, in such a manner as to automatically adjust the focus of the image.

In accordance with the general aspects of the invention, there is provided an array of optical light paths extending from a common focal image viewing plane to one or more terminal locations. Provision is made to cyclically expose a sample, or a plurality of samples of the light paths at the viewing plane to various different areas of an image, as by vibrating the focal plane terminations of the light paths relative to the image. Preferably, the light paths are in a random array in order to uniformly distribute the light received from an image over the cross section of light paths at the terminal location and thereby eliminate distinctly light and dark areas therefrom. The light from a defocused blurred image is "gray" with respect to dark and light, there being no sharp definition between dark and light areas of the image. Thus, there are substantially no variations in the intensities of different areas of the defocused image cyclically received by various of the light path samples, and, accordingly, there is little variation in the intensity of light transmitted from the terminal location. Conversely, the light from a focused image has sharp definition between light and dark areas thereof. The overall intensity of light emanating from the terminal location due to the light path samples cyclically viewing various combinations of distinctly light and dark areas of the focused image varies between relatively high and low values. At one point of the cycle, more samples view dark areas of the image than light areas thereof whereas at a second point of the cycle more light areas are viewed than dark areas. This, of course, effects a cyclic variation between relatively low and high intensities of the light transmitted from the terminal location. The magnitude of the variation, or difference between the low and high intensities, moreover, increases with the sharpness of focus of the viewed image such that a maximum magnitude or difference occurs in response to best focus of the image. The invention further includes means viewing the light transmitted from the terminal location and indicating the magnitude of the intensity variation as a representation of the focus of an image viewed by the light paths.

In accordance with the foregoing basic concept, a preferred embodiment of the invention includes a random array of light paths which are substantially equally divided between a pair of terminal locations. The light paths are advantageously simply and ruggedly comprised of a random bundle of optical fibers adapted at one end to view an optical image and bifurcated at the other end to define two groups of fibers of substantially equal number. With such an arrangement having two terminal locations, the difference between the intensities of light transmitted from the respective terminal locations provides a focus indicating signal which is free of extraneous background intensity variations. More particularly, the focus indicating intensity variations of light transmitted from the terminal locations of the light paths arising from the cyclic scanning of the image are normally superimposed upon relatively larger order variations in the intensity of background light, for example the normal 60 cycle variation of the light produced by electrical lighting appliances. Accordingly, in the provision of a usable focus indicating signal it is desirable that the background intensity variation be removed. The background intensity variation is substantially cancelled in a signal which is proportional to the difference between the intensities of light transmitted from the respective terminal locations because the background light affects the paths terminating at the respective terminal locations substantially equally. It is particularly important to note, however, that the focus indicating intensity variations are not cancelled in the difference signal. The light paths extending from the viewing plane have a statistically equal probability distribution between the terminal locations. There is equal probability that a given sample of adjacent light paths are evenly distributed between the two terminal locations; however, in a statistical distribution of equal probability, there is an associated error deviation from an exactly even split in the distribution. As a result, a greater number of light paths of any given sample terminate at one location than the other. There is, accordingly, a difference between the intensities of light transmitted from the respective terminal locations which varies in accordance with the focus of the image. The difference signal derived from the pair of terminal locations is thus indicative of the focus of the image. As a further feature of the instant embodiment of the invention, it is to be noted that usually the optical paths at the viewing plane need not be moved relative to the image to provide a focus indicating signal. This feature accrues from the error deviation of a statistically equal probability distribution from an exactly even split between the terminal locations, as will be described in greater detail below.

The invention also provides a modified form of focus indicating device of the type outlined hereinbefore which is arranged to provide a focus indicating signal proportional to the difference between the intensities of light transmitted from a pair of terminal locations which is zero when the viewed image is in best focus. The signal passes through zero from one polarity to the opposite polarity (e.g., from positive to negative) as the position of an adjustable lens, or the like, producing the image is varied from a position on one side of that providing best focus to a position on the opposite side thereof. The polarity of the signal thus indicates which side of best focus the lens position is on. Such a signal is particularly well suited to the control of a servo drive system, or the like, for automatically adjusting the lens to a position of best focus.

The invention, together with further advantages and possible objects thereof, will be better understood upon consideration of the following detailed description of a preferred embodiment thereof with reference to the accompanying drawings, wherein:

FIGURE 1 is a schematic view of a preferred embodiment of a device for generating a signal indicative of the focus of an optical image in accordance with the invention;

FIGURE 2 is a view taken at line 2—2 of FIGURE 1 illustrating the cross section of the random bundle of optical fibers employed in the embodiment of FIGURE 1;

FIGURE 3 is a schematic wiring diagram of a preferred comparison circuit which may be advantageously employed in the development of a focus indicating signal;

FIGURE 4 is a graphical illustration of signal intensity with respect to lens position as produced by the embodiment of FIGURE 1;

Figure 5:
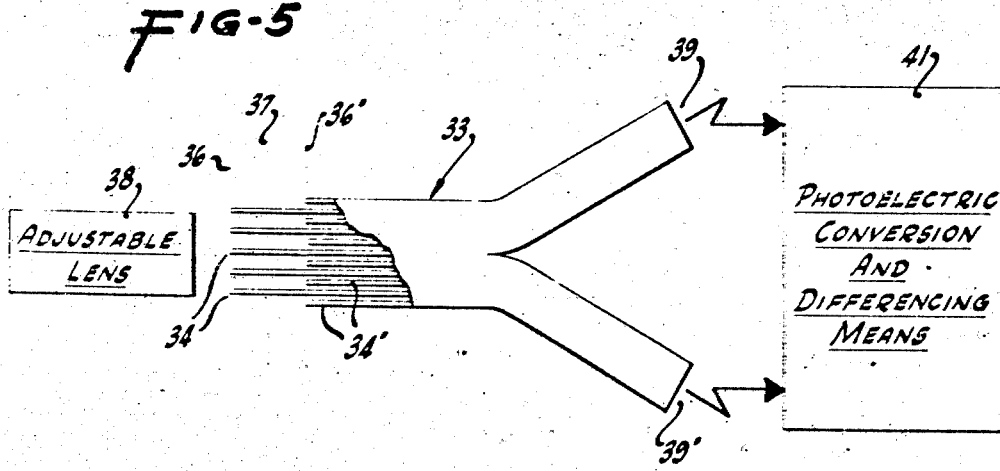
FIGURE 5 is a schematic view of a modified form of device in accordance with the invention.

Considering now the invention in some detail and referring to the illustrated forms thereof in the drawings, there will be seen to be provided a device for generating a signal representative of the best focus of an optical image, or for otherwise indicating when an image is in best focus. The device is described hereinafter with particular reference to visible images, as produced by cameras, range finders, telescopes, etc. However, it is to be noted that the device is also useful in applications involving invisible emanations in the electromagnetic radiation spectrum, e.g., infrared radiation. As noted previously, the invention generally comprises means defining a plurality of optical light paths extending from an image viewing plane to at least one terminal location, preferably with a statistically random distribution. The light paths are advantageously defined by a random bundle of optical fibers. Means are provided for vibrating or oscillating the light paths along, for example, an elliptical path in the image viewing plane so as to cyclically expose different samples of the light paths to different areas of an image. The different samples of the light paths may, for example, be defined by a perforate opaque mask or grating secured to the light path defining means at the viewing plane in intercepting relation to the light paths. The means for moving the light paths may be various mechanical, electromechanical, or equivalent devices operatively associated with the light path defining means, or hand movement of the light path defining means may be employed for this purpose. There are further provided means for viewing the light transmitted from the light paths at the terminal location thereof and providing a light intensity variation signal as an indication of the focus of an image. The signal may, for example, be proportional to the difference between the maximum and minimum levels of the cyclic light intensity variation effected in response to movement of the light paths in the viewing plane relative to the image. When the image is blurred or defocused, there is very little definition between dark and light areas thereof and same may be termed gray. As the various samples of the light paths are swept over different areas of the image, there is consequently only a slight variation in intensity, and a signal proportional to the difference between the maximum and minimum levels of variation of light transmitted from the terminal location is relatively small. Of course, as the image is focused, the definition between light and dark areas thereof is progressively increased. As the samples of the light paths are swept over the relatively light and dark areas of the image, more samples are exposed to light areas than dark areas at one point of the cycle and vice versa at another point of the cycle. As a result, the cyclic variation in the intensity of light transmitted from the terminal location becomes progressively more pronounced and the difference between the maximum and minimum levels of the variation increases as the image approaches best focus. Best focus is consequently indicated by a maximum difference signal. The means for viewing the light transmitted from the terminal location and providing a focus indicating signal may include, for example, a photocell or equivalent means for generating an electrical signal proportional to the intensity of light incident thereon. An AC voltmeter, for example, may then be employed to indicate the magnitude of the cyclic variation of the electrical signal and therefore the focus of the viewed image. As previously noted, the indicating signal is normally superimposed upon a background signal arising from background light and in some instances the background signal may undergo relatively large variations compared to those of the indicating signal. This is particularly the case in an indoor environment wherein there is a substantial 60 cycle variation in the background light due to the use of 60 cycle lighting appliances. Under these circumstances, the variation of the focus indicating signal is substantially undescernible by virtue of the much larger variation in the background signal intensity. Accordingly, the focus indicating device of the present invention preferably includes means for eliminating background signal variations. For example, a 60 cycle filtering network might be employed to eliminate the undesirable 60 cycle background component from the electrical signal applied to the voltmeter, or the like. More preferably, however, the light paths of the device are divided between at least one pair of terminal locations and a signal proportional to the difference between the intensities of light transmitted from the respective terminal locations is derived as the focus indicating signal. Background variations in light intensity are thereby cancelled out. A preferred embodiment of the invention in accordance with this concept is described in detail below.

Referring to FIGURE 1, a preferred embodiment of the focus indicating means includes a plurality of optical light paths which extend from a common image viewing plane, as generally indicated at 11, to a plurality of terminal locations 12. The plane 11 may be, for example, the focal plane of an adjustable lens 13 of a camera, or other optical instrument. The light paths are substantially equally divided among the terminal locations 12 in a statistically equal probability distribution. In the illustrated case, the light paths are distributed between a pair of terminal locations 12 and 12'. However, a greater number such as four terminal locations may be employed. The light paths are preferably respectively defined by the fibers 14 of an optical fiber random bundle 15. More particularly, the bundle is contiguous at one end which is disposed at the image viewing plane 11 and a perforate mask 16 is preferably, although not necessarily disposed transversely across this end of the bundle. The mask perforations define a number of samples of the fibers exposed therethrough to the image at the focal plane 11. The other end of the bundle is bifurcated to provide two groups 17 and 17' of substantially equal numbers of the fibers 14 extending to the terminal locations 12 and 12'. In addition, means are preferably provided to oscillate or vibrate the bundle 15 along, for example, an elliptical path in the focal plane 11 in order to cyclically expose the respective samples of fibers defined by the mask perforations to different areas of an image at the focal plane. Such vibration means are generally indicated at 18, and the dashed line 19 indicates operative association with the bundle.

It will be appreciated that by virtue of the random distribution of the fibers 14 of the bundle 15, there is a statistically even probability that adjacent fibers of a given sample respectively terminate at separate locations 12 and 12'. In such a statistical distribution, however, it will be appreciated that there is an error deviation from an exactly even split between the terminal locations. From the laws of statistical probability, of any given sample of fibers, a larger number will most likely terminate at one location than at the other because of the error deviation from an exactly even distribution. As a result, for any given position of the samples with respect to a sharply focused image at the plane 11, there will be a substantial difference in the light intensities at the terminal locations 12 and 12' because in any sample of fibers, including a composite of all of the samples of fibers, more fibers under one condition of illumination terminate at one location than the other by virtue of the error deviation in the distribution. Of course, the amount of difference between the light intensities at the terminal locations 12 and 12' cyclically varies by virtue of the movement of the samples of fibers with respect to the image as affected by the vibration means 17. Any given sharp line or departure between light and dark in an image will be cyclically exposed to a plurality of samples of the fibers such that in one position of the cycle more samples will be illuminated than are dark, while in another position more samples will be dark than are illuminated. There is thus effected a cyclically varying difference between the intensities at the terminal locations. The variations are of relatively large order where there is sharp definition between light and dark areas of the image as exist when same is in best focus, and relatively slight variation when the image is defocused and substantially gray over all. Moreover, it will be appreciated that background components are cancelled in the difference between the light intensities transmitted from the respective terminal locations. It is of further importance to note that by virtue of the error deviation from an exactly even distribution of the fibers between the terminal locations 12 and 12', the instant embodiment is usually operable without requirement of movement of the bundle with respect to the image. The difference between the intensities of light transmitted from the respective terminal locations 12 and 12' varies in accordance with the focus of an image at the focal plane 11 even when the bundle is in fixed relation to the image.

Although the statistically distributed light paths in accordance with the present invention are preferably provided by the optical fiber random bundle 15, as described hereinbefore, it will be appreciated that various alternatives are possible in the provision of the light paths. For example, a plurality of prisms may be suitably arranged and incased in a plastic light transmitter, or the like, to refract light along a plurality of paths terminating at two or more locations in a statistically distributed manner. An array of mirrors may likewise be employed to reflect light along a plurality of paths in this manner. Irrespective of the particular means employed to define the plurality of light paths, their statistical distribution is best in accordance with the binomial distribution of probabilities. As a result, for the case of the light paths being distributed between two terminal locations such as locations 12 and 12', for any given sample of $n$ paths, $$\frac{n}{2} \pm \frac{\sqrt{n}}{2}$$

paths terminate at one location, while $$\frac{n}{2} \pm \frac{\sqrt{n}}{2}$$

paths terminate at the other location. Thus, in the difference between the intensities of light at the two locations there is an additive effect between the error deviations $$\frac{\sqrt{n}}{2}$$

when there is a line of departure between light and dark areas of the sample. In other words, the difference between the light intensities at the terminal locations is proportional to $\sqrt{n}$ where light and dark areas of the sample exist. It is by virtue of this additive effect between the error deviations that a focus indicating difference signal is produced even when the light paths are not moved or oscillated relative to an image. In instances where more than two terminal locations are employed, appropriate algebraic consideration is given to the error distribution of the light paths of locations being compared to insure the above-noted additive effect.

Considering now the means for observing the difference between the light intensities at the terminal locations 12 and 12' as an indication of the sharpness of focus of an image at the focal plane 11, same will be seen to preferably include a pair of photocells 20 and 20' or equivalent means respectively disposed at the terminal locations 12 and 12' in receiving relation to the light respectively transmitted therefrom. The term "photocell," as employed herein, is to be taken as being generically indicative of a variety of photosensitive devices, including solid-state photo-diodes and photo-transistors. The photocells respectively generate electrical signals which are proportional to the intensities of light transmitted from the terminal locations 12 and 12'. It will be appreciated that as an alternative arrangement a single photocell may be employed in conjunction with light chopper means to alternately view the light from the respective terminal locations. The electrical output signal from the single photocell is thus pulsed and successive pulses are alternately proportional to the intensities of light from the respective terminal locations. The single photocell arrangement is advantageous from the standpoint of balance, the electrical intensity indicating signals for both terminal locations being generated by the same device. The electrical output signals of the photocells, or photocell, may be applied to comparison means 21 arranged to provide a signal proportional to the difference between the electrical signals thereby generated or to otherwise indicate their difference. Although the comparison means 21 may be variously provided, where two photocells are employed the comparison means is preferably arranged as indicated in FIGURE 3. In this regard, the negative terminal of, for example, photocell 20 is connected to the positive terminal of photocell 20', while the positive terminal of photocell 20 is connected to the negative terminal of photocell 20' through a balancing resistor 22. Thus, the photocells are connected in parallel opposed relationship through the balancing resistor 22. The variable tap 23 of resistor 22 is, in turn, connected through a voltmeter 24, or the like, to the common juncture between the negative terminal and positive terminal of photocells 20 and 20', respectively. In addition, a compensating resistor 26 may be connected across one photocell, in the illustrated case photocell 20', for the purpose of compensating for differences between the frequency responses of the particular pair of photocells 20 and 20' employed in the circuit. With the comparison means 21 provided in the manner just described, it will be appreciated that light impinging the photocells 20 and 20' from terminal locations 12 and 12' effects the generation of output signals from the respective photocells in proportion to the light intensities impinging same, and the difference between the signals generated by the photocells is developed across the voltmeter 24. The variability of the balancing resistor 22 facilitates adjustment of the photocell signals so as to compensate for any inequalities between the respective branches of the system when the focal plane 11 receives light of uniform intensity, i.e., gray light. In other words, the balancing resistor 22 provides a zero calibration adjustment for a completely defocused image at the focal plane 11, the resistor being initially adjusted to provide a zero D.C. voltage indication on the voltmeter 24 in response to the impingement of gray light uniformly upon the focal plane 11. With the comparison means thus initially calibrated, the reading of the voltmeter 24 may be observed as an indication of the sharpness of focus of an image at the focal plane 11. More particularly, the adjustable lens 13 may be varied until the voltmeter 24 indicates maximum voltage, which voltage is representative of a maximum difference between the intensities of light transmitted from the terminal locations 12 and 12'. In accordance with the considerations advanced hereinbefore, at this time there exists maximum sharpness or departure between light and dark areas of samples of adjacent light paths at the focal plane 11 which is indicative of true focus of the image thereat. The variation in signal intensity, as recorded by the voltmeter 24, with respect to the position of adjustable lens 13 is thus as indicated in FIGURE 4, wherein the signal intensity curve exhibits a relatively sharp peak which is centered at the focus position of the lens indicated by the dashed line 27. It is believed apparent from the signal intensity curve of FIGURE 4 that as the position of adjustable lens 13 is varied in either direction away from the focus position 27, the intensity of the signal indicated by voltmeter 24 rapidly drops off to a negligible value. At focus of the adjustable lens 13 the signal has a maximum amplitude.

Although the voltmeter 24 is employed in the comparison circuit of FIGURE 3 to provide an indication of the sharpness of focus of an image produced at the focal plane 11 by the adjustable lens 13, the signal applied to the voltmeter may as well be employed to control the position of the lens in such a manner as to automatically focus same. The difference signal developed by the comparison means 21 may, for example, be employed, as indicated in FIGURE 1, to control lens adjusting means 28 operatively associated with the adjustable lens 13 to vary the position thereof in accordance with the signal. The adjusting means 28 may be, for example, a servo positioning system of a type which is adapted to servo on the peak or maximum of the signal intensity curve of FIGURE 4. Thus, in response to a low intensity difference signal the adjusting means 28 would vary the position of the adjustable lens 13 in the direction of the focus of 27. In response to the maximum intensity of the signal, variation of the lens position would be terminated and the lens would be thus focused. Accordingly, in the foregoing manner, the present invention may be employed for the automatic focusing of a lens.

Considering now another application of focus indicating and adjusting devices in accordance with the invention, it should be noted that same may be employed with a split image range finder, or other split image device, to provide an indicating or control signal representative of whether or not the split images coincide. More particularly, in the case of the embodiment of FIGURE 1 the viewing plane 11 of the randomly distributed light paths of the device may be disposed in viewing relation to the focal plane of a split image device. When the images are split, the contrast between the split images and the background is about half of what it is when the images coincide. In addition, the area of the light paths over which the intensities of the split images are distributed is about twice the area over which the intensity of the coinciding images is distributed. As a result, the difference between the intensities of light transmitted from the terminal locations 12 and 12' is much greater when the images coincide than when they are split. Thus, the difference signal developed by the device of the present invention is in this case representative of whether or not the split images coincide.

Figure 6:
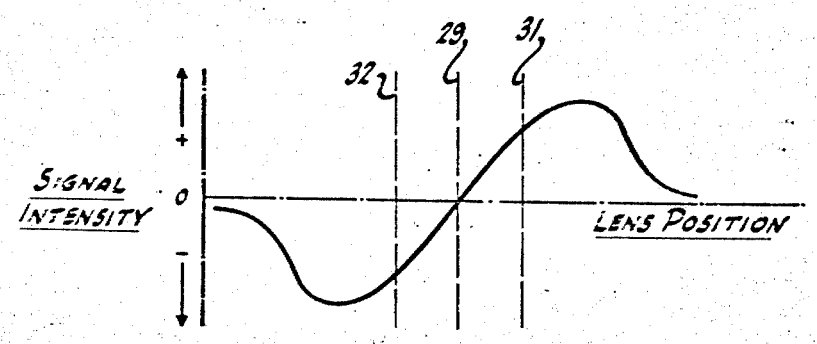
FIGURE 6 is a graphical illustration of signal intensity with respect to lens position as produced by the embodiment of FIGURE 5.

Referring now to FIGURE 5, there will be seen to be provided a modified form of focus indicating or adjusting device in accordance with the invention which is arranged to provide a signal intensity versus lens position curve of the type illustrated in FIGURE 6. It is of importance to note that the signal intensity is zero for the best focus position of the lens which is indicated by the dashed line 29. Moreover, the signal intensity curve passes through zero symmetrically from one polarity to the opposite polarity (e.g., from positive to negative) as the position of the adjustable lens is varied from a position 31 on one side of the best focus position 29 to a position 32 on the opposite side thereof. It will be appreciated that the curve of FIGURE 6 is particularly well suited to the control of a servo system such as may be employed as the adjusting means 28 for varying the position of the adjustable lens 13. In this regard, the polarity of the signal provides an indication of the direction in which the lens must be varied to obtain best focus. In the illustrated case, positive polarity indicates that the lens is positioned to the right of the best focus position while negative polarity indicates that the lens is positioned to the left of the best focus position. The servo lens adjusting system may thus be arranged to translate the lens to the left in response to a positive signal and to the right in response to a negative signal while retaining the lens position in response to zero signal. Such operation may be readily and simply accomplished as by means of a polarity sensitive servo motor which rotates in opposite directions, e.g., clockwise and counterclockwise, in response to positive and negative signals, respectively. Clockwise rotation may be employed to effect translation of the lens to the left, while counterclockwise rotation may be employed to effect translation of the lens to the right. Thus, when the motor input energization is proportional to the intensity signal, the motor drives the lens in the direction of the best focus position and stops as its input energization becomes zero to thereby position the lens at best focus.

In the provision of a signal intensity curve of the type depicted in FIGURE 6, the embodiment of FIGURE 5 will be seen to include randomly distributed light paths which terminate in substantially equal numbers at two planes or levels equidistantly disposed on opposite sides of the focal plane of a lens. The light paths may be defined by a relatively low density or loosely packed bundle 33 of randomly distributed optical fibers, or equivalent means, wherein substantially half of the fibers 34 terminate at a plane 36 and the other half of the fibers 34' terminate at a plane 36' longitudinally displaced from the plane 36. The low density of the bundle is desired in order that adjacent fibers are relatively widely dispersed so as to freely expose the ends of fibers at the interior plane 36' to light transmitted from an image. The bundle is disposed such that the best focus focal plane 37 of an adjustable lens 38 is positioned centrally between the planes 36 and 36'. The fibers 34 from plane 36 extend in a preferably randomly distributed manner to a first terminal location 39, while the fibers 34' from plane 36' similarly extend in a preferably randomly distributed manner to a second terminal location 39'. Provision is made to vibrate the bundle 33 with respect to an image, and in this regard suitable mechanical vibration means may be employed or the bundle may be vibrated by hand in the manner previously described. It will be appreciated that during such vibration or movement the cyclic variation in the intensity of light transmitted from terminal location 39 is greater than that transmitted from terminal location 39' when the focus of an image is sharper at plane 36 than it is at plane 36', and vice versa. When the sharpness of focus of an image is the same as viewed by both planes 36 and 36', the cyclic variations in intensities transmitted from both terminal locations 39 and 39' are substantially equal. As the position of the adjustable lens 38 is varied, the position of an adjustable image is longitudinally displaced with respect to the planes 36 and 36'. As the focused image position is moved in opposite longitudinal directions between the planes 36 and 36', the image position is respectively moved away from one plane towards the other, and vice versa. Thus, the image as viewed by one plane becomes progressively defocused, while the focus of the image as viewed by the other plane becomes progressively sharper. The cyclic variation in intensity of light transmitted from one terminal location consequently progressively decreases while that transmitted from the other terminal location progressively increases as the position of the focused image is displaced between the planes 36 and 36'. When the position of the focused image is midway between the planes 36 and 36', i.e., at the focal plane 37, both planes view equal sharpnesses of focus of the image and the variation of light intensities transmitted from both terminal locations 39 and 39' are thus equal.

The foregoing may be better understood if it is assumed that a focused image is positioned to the left of focal plane 37, and therefore closer to plane 36 than to plane 36'. The image will thus appear to be relatively sharp at plane 36 and relatively blurred at plane 36'. As various samples of the light paths terminated at the respective viewing planes 36 and 36' are swept over different areas of the image by vibration of the bundle 33, the cyclic variation in the intensity of light transmitted from terminal location 39 is greater than that of light transmitted from terminal location 39'. Now if the focused image is positioned to the right of the focal plane 37, and therefore closer to plane 36' than to plane 36, plane 36' views a sharper image than plane 36. As a result, the cyclic variation in light intensity transmitted from terminal location 39' now exceeds that transmitted from terminal location 39. As noted previously, the degrees of focus viewed by both planes 36 and 36' are the same when the image is positioned at the focal plane 37, as are therefore cyclic intensity variations transmitted from both terminal locations 39 and 39'. Hence, the algebraic difference between the rectified D.C components of the cyclic intensity variations transmitted from the respective terminal locations varies from one polarity to the opposite polarity as the position of the focused image is varied by variation of the position of the adjustable lens 38. The difference is zero when the focused image is positioned at focal plane 37 and the lens is at its position of best focus. The curve of the D.C. difference between the intensities of light transmitted from terminal locations 39 and 39' versus position of lens 38 is consequently as illustrated in FIGURE 6.

In order to provide an electrical signal proportional to the difference between the rectified D.C. components of the light variations at 39 and 39' and which is therefore indicative of the focus of the image, suitable photoelectric conversion and D.C. differencing means 41 are provided in light receiving relation to the terminal locations 39 and 39'. The means 41 may be quite conventional. The signal may be employed in the manner previously described to control lens adjusting means associated with the lens 38 and adjust same to its position of best focus.

Although the present invention has been described hereinbefore with respect to but several preferred embodiments, it will be appreciated that numerous variations and modifications may be made therein without departing from the true spirit and scope of the invention, and thus it is not intended to limit the invention except by the terms of the following claims.

What is claimed is:

1. Focus indicating apparatus comprising means defining at least one light path extending from a focal image viewing plane to a terminal location, means for moving each light path in said viewing plane relative to an image viewed by said viewing plane to cyclically expose different areas of said image to each light path whereby a cyclic variation in the light intensity transmitted from said terminal location is effected which progressively increases as the image varies from a defocused to a focused condition, and means viewing the intensity variation of light transmitted from said terminal location and providing an indication of the magnitude of the variation as a representation of the focus of said image.

2. Apparatus according to claim 1, wherein said means viewing the intensity variation of light transmitted from said terminal location includes photoelectric conversion means for generating an electric signal proportional to said intensity variation with the magnitude of said signal being indicative of the focus of said image.

3. Focus indicating apparatus comprising means defining an array of optical light paths extending from at least one image viewing plane to at least one terminal location, means for cyclically exposing a plurality of samples of said light paths at each of said viewing planes to different areas of an image thereby viewed, and means viewing the cyclic variation in light intensity transmitted from each terminal location as an indication of the focus of said image.

4. Focus indicating apparatus according to claim 3, wherein said light paths are in a random array.

5. Focus indicating apparatus comprising means defining a random array of light paths extending from an image viewing plane to a terminal location, means for cyclically exposing samples of said light paths to different areas of an image at said viewing plane, and means for converting the intensity of light transmitted from said terminal location to a proportional electrical signal the magnitude of which varies in accordance with the focus of said image.

6. Focus indicating apparatus comprising means defining an array of optical light paths extending from a focal image viewing plane to a plurality of terminal locations in a statistically equal probability distribution, and means viewing the relative intensities of light transmitted from said terminal locations as an indication of the focus of an image viewed by said viewing plane.

7. Focus indicating apparatus comprising means defining a plurality of optical light paths extending from a focus viewing plane in a statistically even probability distribution to a pair of terminal locations whereby there is equal probability within a range of error deviation that adjacent paths at the focus viewing plane respectively terminate at one or the other of the terminal locations, and means at said terminal locations viewing and comparing the intensities of light received from said paths respectively terminating thereat as an indication of the focus of an object viewed by said focus viewing plane.

8. Focus indicating apparatus comprising means defining a bifurcated group of optical light paths extending from a common position of origin at a focal plane to first and second terminal locations with a statistical distribution of probabilites such that for any given sample of $n$ adjacent paths, $$\frac{n}{2} + \frac{\sqrt{n}}{2}$$

paths terminate at said first terminal location while $$\frac{n}{2} - \frac{\sqrt{n}}{2}$$

paths terminate at said second terminal location, and means viewing the difference between the intensities of light transmitted from the light paths at said first and second terminal locations as an indication of the focus of an image focused at said focal plane, said focus being indicated by a maximum light intensity difference.

9. Focus indicating apparatus according to claim 8, further defined by said difference viewing means comprising a pair of photocells respectively viewing said first and second terminal locations and electrically connected in opposing relationship to thereby generate an electrical output signal proportional to the difference in light intensities transmitted from the paths at said first and second terminal locations.

10. Focus indicating apparatus comprising a random bundle of optical fibers positioned at one end to view an optical image and bifurcated at the other end to define two groups of fibers of substantially equal number, substantially all sets of adjacent fibers at the first end of said bundle being thereby distributed with equal probabilities between said two groups of fibers at the second end of the bundle, and means indicating the difference in light intensites transmitted by said two groups of fibers as an indication of the sharpness of focus of said optical image.

11. Focus indicating apparatus according to claim 10, further defined by means for oscillating the first end of said bundle of fibers to eliminate the possibility of light transmitted from a given portion of said image impinging a sample of adjacent fibers at the first end of said bundle terminating in exactly equal numbers in said groups at the second end of said bundle.

12. Focus indicating apparatus according to claim 10, further defined by said difference indicating means comprising a pair of photocells respectively disposed in confronting relation to the ends of said groups of fibers, and means electrically connecting said photocells in opposed relationship to develop an electrical output signal proportional to the difference in light intensities transmitted by said groups of fibers.

13. Focusing indicating apparatus comprising adjustable lens means for variably focusing an object at a focal plane, a random bundle of optical fibers having one end disposed in viewing relation to said focal plane and bifurcated at the other end to define two groups of fibers of substantially equal number distributed such that of any sample of $n$ adjacent fibers at the first end of the bundle $$\frac{n}{2} \pm \frac{\sqrt{n}}{2}$$

of these fibers are disposed in one group while $$\frac{n}{2} \mp \frac{\sqrt{n}}{2}$$

of these fibers are disposed in the other group, a pair of photocells respectively disposed in light receiving relation to said groups of fibers and electrically connected in opposition to generate an output signal which varies from a minimum to a maximum as the focus of said adjustable lens means is varied from a defocused to a focused position, and means for moving the first end of said bundle of fibers in said focal plane.

14. Focus indicating apparatus according to claim 13, further defined by said photocells being connected with the positive terminal of one to the negative terminal of the second, and a variable balancing resistor having its opposite ends connected to the negative terminal of the first photocell and the positive terminal of the second photocell, said resistor having a variable tap with said output signal being derivable from between said tap and the common connection of the positive terminal and negative terminal of said first and second photocells respectively.

15. Focus indicating apparatus comprising means defining first and second pluralities of light paths respectively extending from a pair of longitudinally spaced apart image viewing planes to a pair of terminal locations, and means viewing the relative intensities of light transmitted from said terminal locations as an indication of the focus of an image viewed by said viewing planes.

16. Focus indicating apparatus comprising means defining a pair of equal number random arrays of light paths respectively extending from a pair of longitudinally spaced apart image viewing planes to a pair of terminal locations, and means for viewing the D.C. difference between rectified intensity variations of light transmitted from said terminal locations in response to movement of said pair of light path arrays relative to an image as an indication of the focus of the image at a focal plane positioned longitudinally centrally between said image viewing planes.

17. Focus indicating apparatus according to claim 16, further defined by said means for viewing the D.C. difference between rectified intensity variations of light transmitted from said terminal locations including photoelectric conversion means for generating an electrical signal proportional to the difference in rectified variations in light intensity, said electrical signal thereby varying from one polarity to the opposite polarity as the focus of said image is displaced longitudinally between said viewing planes and passing through zero when said image is focused at said focal plane.

18. An automatic focusing apparatus comprising adjustable lens means for producing an optical image having a sharpness of focus which varies as a function of lens position, means defining an array of light paths extending from a focal plane viewing said image to a terminal location, means for cyclically exposing samples of said light paths at said focal plane to different areas of said image whereby a cyclic variation is produced in the intensity of light transmitted from said terminal location with the magnitude of the intensity variation increasing as a direct function of the sharpness of focus of said image, means viewing said terminal location for converting the light intensity variation transmitted therefrom to an electrical signal proportional to the magnitude of said light intensity variation, and lens adjusting means operatively associated with said lens for varying the position thereof in accordance with said electrical signal.

19. Automatic focusing apparatus comprising adjustable lens means for producing an optical image having a sharpness of focus which varies as a function of lens position, means defining an array of optical light paths extending from a focal plane viewing said image to a plurality of terminal locations in a statistical equal probability distribution, means viewing said terminal locations and generating a signal proportional to the difference between the intensities of light transmitted therefrom, and lens adjusting means operatively associated with said lens for varying the position thereof in accordance with said signal.

20. Automatic focusing apparatus comprising adjustable lens means for producing an optical image having a sharpness of focus which varies as a function of lens position, said lens means having a focus position wherein the sharpness of focus is a maximum and positions of increasing displacement from the focus position wherein the sharpness of focus is progressively decreased, means defining a plurality of light paths extending from a focal plane in viewing relation to said image to a pair of terminal locations with a statistical distribution of probabilities such that for any given sample of $n$ adjacent paths, $$\frac{n}{2} \pm \frac{\sqrt{n}}{2}$$

paths terminate at one terminal location while $$\frac{n}{2} \mp \frac{\sqrt{n}}{2}$$

paths terminate at the other terminal location, means viewing said terminal locations and generating an electrical signal proportional to the difference between the intensities of light respectively transmitted therefrom, said signal being a maximum in response to maximum sharpness of focus and rapidly decreasing in response to decreasing sharpness of focus, and lens adjusting means for varying the position of said lens in accordance with said signal, said adjusting means varying said position of said lens in the direction of said focus position in response to signals less than said maximum and maintaining said lens in said focus position in response to said maximum of said signal.

21. Automatic focusing apparatus according to claim 20, wherein said means defining the light paths comprises a random bundle of optical fibers bifurcated at one end to define two groups of fibers of substantially equal number respectively terminating at said pair of terminal locations.

22. Automatic focusing apparatus comprising adjustable lens means for producing an optical image having a sharpness of focus at a predetermined focal plane which varies as a function of lens position, means defining first and second equal pluralities of light paths respectively extending from a pair of longitudinally spaced apart image viewing planes disposed equidistantly on opposite sides of said focal plane to a pair of terminal locations, means viewing said terminal locations and generating a signal proportional to the difference in rectified variations in the intensities of light transmitted therefrom in response to movement of the light paths with respect to an optical image, and lens adjusting means operatively associated with said lens for varying the position thereof in accordance with said signal, said lens adjusting means being inactive in response to zero signal.

23. Automatic focusing apparatus according to claim 22 wherein said means defining said light paths comprises a loosely packed random bundle of optical fibers, said bundle at one end having fibers terminating at two longitudinally displaced levels defining said image viewing planes, said bundle bifurcated at its other end to define two groups of fibers respectively extending from said levels and the ends of which define said terminal locations.

24. Automatic focusing apparatus according to claim 23, further defined by vibration means operatively associated with said bundle to vibrate the ends of said fibers in said image viewing planes.

References Cited

UNITED STATES PATENTS

| | | | |
|---|---|---|---|
| 2,831,057 | 4/1958 | Orthuber | 250—201 X |
| 2,968,994 | 1/1961 | Shurcliff | 88—1 |
| 2,975,285 | 3/1961 | Polnier | 88—14 |
| 3,035,176 | 5/1962 | Kis et al. | 250—210 |
| 3,218,909 | 11/1965 | Fain | 88—1 |

RALPH G. NILSON, *Primary Examiner.*

M. A. LEAVITT, *Assistant Examiner.*